United States Patent
Goldstein (10) Patent No.: US 11,185,774 B1
(45) Date of Patent: Nov. 30, 2021

(54) HANDHELD COMPUTER APPLICATION FOR CREATING VIRTUAL WORLD GAMING SPHERES

(71) Applicant: Gil-ad Goldstein, Kalia (IL)

(72) Inventor: Gil-ad Goldstein, Kalia (IL)

( * ) Notice: Subject to any disclaimer, the term of this patent is extended or adjusted under 35 U.S.C. 154(b) by 0 days.

(21) Appl. No.: 16/749,240

(22) Filed: Jan. 22, 2020

(51) Int. Cl.
*A63F 13/53* (2014.01)
*G03B 37/02* (2021.01)
*A63F 13/52* (2014.01)
*A63F 13/352* (2014.01)

(52) U.S. Cl.
CPC ............ *A63F 13/53* (2014.09); *A63F 13/352* (2014.09); *A63F 13/52* (2014.09); *G03B 37/02* (2013.01)

(58) Field of Classification Search
CPC ........ A63F 13/53; A63F 13/52; A63F 13/352; G03B 37/02; G06T 7/32; G06T 15/205; G06T 3/0018
See application file for complete search history.

(56) References Cited

U.S. PATENT DOCUMENTS

| | | | | |
|---|---|---|---|---|
| 6,486,908 | B1* | 11/2002 | Chen | G06T 3/0018 345/441 |
| 2007/0025723 | A1* | 2/2007 | Baudisch | H04N 5/262 396/287 |
| 2009/0022422 | A1* | 1/2009 | Sorek | G06T 3/4084 382/284 |
| 2009/0058990 | A1* | 3/2009 | Kim | G06T 7/32 348/36 |
| 2012/0038549 | A1* | 2/2012 | Mandella | G06F 3/011 345/156 |
| 2015/0062292 | A1* | 3/2015 | Kweon | H04N 5/23238 348/37 |
| 2018/0342100 | A1* | 11/2018 | Mollis | G06T 15/205 |

* cited by examiner

*Primary Examiner* — Reginald A Renwick
(74) *Attorney, Agent, or Firm* — Edwin D. Schindler (57) ABSTRACT

A computer application for performing a method for creating a panoramic view port about a nodal point, which includes positioning an image-capturing mobile device at a nodal point, capturing a first digital image having a focal point within the image's left, right, top and bottom image borders, pivoting the mobile device about the nodal point, either vertically or horizontally, until the focal point of a subsequent image moves outside an image border of a previous image, in which an application indicator then displays on a preview image aiding in adjacent border alignment subsequent to image capture. Thereafter, there is a conjoining of the subsequent image with the one or more previous images into a sphere segment and looping through the process of pivoting the image-capturing mobile device, and conjoining subsequent captured images with the sphere segment, until a desired spherical view port about a nodal point has been created.

11 Claims, 5 Drawing Sheets

HANDHELD COMPUTER APPLICATION FOR CREATING VIRTUAL WORLD GAMING SPHERES

BACKGROUND OF THE INVENTION

Technical Field of the Invention

The present invention relates, generally, to computer applications and, more particularly, to a computer application for a handheld computer enabling a user to take a plurality of images to create a panoramic field of view about the nodal point of the handheld computer's camera lens, which can then be used as a gaming sphere with the application providing weapons and enemy avatars that can be selectively inserted into the sphere.

SUMMARY OF THE INVENTION

It is therefore an object of the present invention to provide a computer application, which would preferably be handheld, for creating virtual world gaming spheres by enabling a user, or player, to take a plurality of images for creating a panoramic field of view for virtual gaming.

It is a further object of the present invention to provide a computer application for creating virtual gaming spheres which includes layers a plurality of spheres by creating a first virtual sphere from a first handheld computer nodal point, the positioning to a second nodal point approximate the first nodal point for assembling a second sphered for forming conjoined spheres for creating a sense of movement of the spheres in time.

An important object of the present invention is to provide a handheld computer having a processor, memory, operating system, communications software, camera and sensor means for determining computer movement through six axes, with a computer application ("app") to capture images to create a digital sphere up to 360° panoramic field of view about the nodal point of the handheld computer's camera lens.

Another object of the present invention is to provide a remote server accessible to users through an internet website having server computer application for uploading, storing and downloading virtual spheres created using the app that can be shared and/or traded and/or licensed through said website.

Yet, a further object of the present invention is to provide a computer app for a handheld computer wherein said app provides a capture image function comprising both a single image capture and a multiple image capture in which the software actuates camera image capture function as the handheld computer is rotated about a nodal point of the handheld computer.

Still yet another object of the present invention is to provide an app for a handheld computer having a join function whereby a plurality of app captured single images are conjoined to create sphere segments.

An additional object of the present invention is to provide an app wherein the single image capture mode provides a pre-capture image display, in which each captured image is provided with a peripheral virtual alignment border area by the computer application and a visual alignment indicator that illuminates in a first color when a subsequent pre-capture image is not border aligned with the prior image and a second color indicating alignment thereby allowing capture of the next image used in creating the virtual sphere.

A further object of the present invention is to provide an app creating an ambient digital environment where users can position to a location to create tunnels and portals.

A still further object of the present invention is to provide an app that provides a visual indicator for a virtual sphere location marking a vector point serving as a tunnel or portal between spheres.

A still yet further object of the present invention is to provide a computer application for handheld computers to create a plurality of 360° panoramic fields of view (spheres) about a plurality of nodal points for said handheld computer.

Another object of the present invention is to provide an app for a handheld computer for conjoining a plurality of virtual spheres by creating a first virtual sphere through a first handheld computer nodal point, then selecting a location from said first virtual sphere, positioning the handheld computer at a second nodal point wherein subsequent images are captured to create a second sphere with the process of creating tangent spheres by repositioning the handheld computer's nodal point from a former sphere nodal point to an adjacent position then creating other spheres as desired thereby creating a compilation of vectored spheres providing users with simulated movement through a three-dimensional space.

Yet another object of the present invention is to provide an app having a plurality of avatars that can be selectively placed within a virtual sphere for gaming purposes and with the computer application providing a multitude of parameters for such avatars with the avatar parameters including appearance, time and location within a virtual sphere.

A further object of the present invention is to provide a computer application having an edit function providing filters for changing colors of the virtual sphere, and with the edit function to include an edit game function where virtual spheres can be selectively enhanced and uploaded to the remote server thereby accessible to other players.

A still further object of the present invention is to provide the computer application with a remote server for a multi-player function, so that a plurality of users can initiate game play within a virtual sphere.

An additional object of the present invention is to provide a computer application with a multi-player function using the handheld computer's communication software, such as Bluetooth®, wherein a plurality of handheld computer users can interact within a virtual sphere with the interaction displayed simultaneously on the displays of each player.

Another object of the present invention is to provide a computer application for a handheld computer having a remote server with a multi-player function, so that a plurality of users can initiate game play within a virtual sphere.

Yet another object of the present invention is to provide an app for a handheld computer having an interface whereby ancillary devices, such as glasses or weapon shaped devices, can be incorporated into game play.

The foregoing and related objects are accomplished by a computer application for performing a method for creating a panoramic view port about a nodal point, which includes the steps of positioning an image-capturing mobile device at a nodal point, capturing a first digital image having a focal point within the image's left, right, top and bottom image borders, pivoting the mobile device about the nodal point, either vertically or horizontally, until the focal point of a subsequent image moves outside an image border of a previous image, in which an application indicator then displays on a preview image aiding in adjacent border alignment subsequent to image capture. Thereafter, there is a conjoining of the subsequent image with the one or more previous images into a sphere segment and looping through the process of pivoting the image-capturing mobile device, and conjoining subsequent captured images with the sphere segment, until a desired spherical view port about a nodal point has been created.

The computer application of the present invention has many possible applications, as noted in this disclosure. For simplicity, one preferred embodiment, the game sphere, comprises creation of a basic construct and enhancements including emulating apparent movement through digital space, adding digital entities, tools and gateways each having property charts and application provided selectable functions along with user control means for selectively actuating said functions.

The computer application of the present invention provides users of mobile electronic devices, including smart phones and notebooks, with tools to capture digital images of an ambient physical environment and digitally replicate the ambient physical environment, hereinafter called a "sphere," as a basic construct for selective inclusions of application provided sphere mods, including: Emulating apparent movement through digital space by creating a plurality of spheres from nodal points vectoring off, path-like, to other nodal point sphere locations, for example, gaming needs for concealed locations, rapid apparent movement using nodal point sphere spacing, etc., with nodal point movement controlled by the user through provided software actuator(s); and adding other digital entities having their own controls and user selectable properties provided by the application including avatars, weapons and tunnels and doors serving as conduits to other spheres.

Ultimately, the endeavor of the application of the present invention is to provide anyone anywhere having access to a smart phone or notebook with software application tools to nurture their creativity in assembling an ambient digital environment from their current physical environment, one digital image at a time conjoined in real time until the conjoined images create a sphere or sphere segment greater than or equal to 180° that can then be embellished with other digital entities having their own functions and properties.

Moving beyond the typical mobile device app, the application encourages social interaction between application users by providing Internet accessible database for uploading and downloading one's own and other's sphere compilations. In one anticipated aspect, developers conjoin sphere compilations into a massive gaming labyrinth.

As mentioned above, it is preferable to further include an Internet accessible website for uploading and downloading application created/modified virtual spheres that can be shared and/or traded and/or licensed through the website. The computer application of the present invention further allows users to create tunnels, or portals, for serving as passages between spheres.

Additionally, the application provides for layering spheres by creating a first virtual sphere from a first handheld computer nodal point then positioning to a second nodal point approximate the first nodal point, followed by assembling a second sphere forming conjoined spheres creating apparent movement of the sphere moving in time.

In one preferred embodiment, it is desirable to provide the computer application for a handheld computer of the present invention with means for creating virtual spheres up to 360° about a handheld computer's nodal point forming a game sphere where the user is provided with weapons and enemy avatars that can be selectively added.

In a further preferred embodiment, it is desirable to provide the computer application of the present invention with means for adding tunnels/portals between spheres and conjoining spheres by creating a first virtual sphere from a first nodal point then positioning to a second nodal point approximate the first nodal point and creating a second sphere with the process continuing through an Nth number of spheres creating a three-dimensional sphere for gaming and other variable purposes.

The following titled sections describe in more detail the application functions of creating spheres and enhancing them with apparent movement on a digital display, adding other digital entities including avatars and weapons with their own functional properties, adding ingress and egress portals enabling movement between spheres and viewing the interior of a sphere either through the ubiquitous tactile swipe or rotation of the mobile electronic device.

Capture Sphere:

Using a hand held computer's camera using the app of the present invention provides for taking pictures to create a 360-degree panoramic scale on six axes. Moving the hand held computer's camera around, a lens might be added to capture up to half a sphere. Once this option selected, the user would see a button that would begin the capturing algorithm: the first photo would be taken upon pressing the button. Once the center of focus is outside of the captured area, the camera would take an additional picture and stitch it on to the previous one and so forth.

Once the first Sphere is complete the creator would face options: create secondary sphere on same location (to create time moving spheres); create a tunnel: for short and straight distances, focus on far spot and zoom in moving to the second sphere location through frame-by-frame pictures or for tunnels having a difficult geometry, play a short video. Create portal: a "dark door" that connects two different spheres, save and continue Load Sphere:

Load Sphere: load normal sphere with no "Avatars", may contain moving-Sphere/s, tunnels, additional Sphere/s.

Load Game-Sphere: load sphere that contains "Avatars". May also contain everything normal Sphere contain. The Sphere would be displayed as following: when Sphere loaded, there would be the option to view the Sphere when dragging fingers, there would be the option to view the sphere when moving the hand held computer. (The option location may vary.)

Edit Sphere:

Edit colors; Extra editing; Adding to the Sphere "Avatars" that respond to the user actions. At what time from load/event-in-game should "Avatar" appear, what location "Avatar" should appear, what actions should avatar do? (engage/disengage/move/run-/jump/crawl/fly/etc. . . . ) "If, Else, Then" functions: if user does X Then "Avatar" do Y, Else do Z.

Adding portals and connecting different spheres

Upload/Download (from remote server):

Users would be able to upload Sphere or Game-Sphere and can choose some of the following options:

Upload a selected Sphere or Game-Sphere upload for free download upload for # credits upload for team Download a selected Sphere or Game-Sphere the download will be determined depends on the uploading method used Connect to SD World:

Connect to SD world (would be explained on Extras under Lobby room) may evolve to something bigger, such as a world that consists of "rooms" each room has a different interaction purpose. Rooms—rooms are bigger more detailed version of Levels. Settings: different settings, nothing special here.

Phase I—the user captures a picture:

Once the picture has been taken the Sphere creation has begun. The user captures a 360-degree Sphere panorama. The capturing and storing the Sphere file would be done using a hand-held-computer.

Phase II—Sphere has been created:

Once the first Sphere is complete the creator would face options:
- create a "time-moving-Sphere" (more then one Sphere sharing location)
- create a tunnel (straight/curve/short/long)
- create a portal ("teleport" to a different Sphere)

Phase II. I—If a tunnel has been created then we move back to Phase I.

Phase III—Save creation.

The Sphere file can be saved after a Sphere has been completed (whether it's the first or the last.)

Phase IV—Edit selected Sphere.

Once a Sphere/Level file has been saved the user can enter the Sphere/Level file and add some behavior manners, such as adding "Avatars" to a specific (or random) sphere creation, changing the color behavior of the Sphere (negative, color enhance, color swap and filters.)

Phase V—"Avatars"

Adding avatars would be as easy as dragging it from selected avatar menu. The avatars are added to their own unique location where users may submit their own avatars.

To be added to the "library" (must be fully designed with basic movement abilities.) Avatars may possess unique abilities that may vary from "run left 15 seconds after creation" to "jump left, roll right, shoot, if avatar near shot then run away" and also: "If, Else, Then" functions: if "Event" X Then "Avatar" does Y, Else does Z. Adding unique abilities is as easy as dragging them from the select abilities menu.

Phase V Explained:

Avatars would be used for different purposes, the first to be used for training awareness reaction and prediction. Some avatars later on would be used as NPCs (None Playing Characters) to be used to help the user and provide information or offer interaction options.

Phase VI—Download/Upload/Co-play.

Users can upload their creations online to share with the community.

Users can download outer creators Sphere/Level and manipulate it as it was their own.

Users who share the same Sphere/Level can co-exist on the same Sphere dimension (viewing/interacting multi users on the same Sphere/Level) for this phase Sphere/Level is storing on hand held computer is optional.

Part VII—Sphere World!

Eventually once there is enough data in the library, there would be a Sphere World Created, the Sphere world would be built from Spheres tunnels and portals. Part VII.1—Friendly NPCs would be scattered around the world to guide users throughout the interface of the program, giving knowledge to the user.

Extras:

Shooting Range—a Sphere to calibrate shooting and adjusting it to the program.

Speed Training—an Avatar sequence to run on selected Sphere vary on a level scale of 1-100.

Missions—Take a number of Levels and conjoin them in to a Mission (may edit the Avatars) to create a mission for co-play. (missions might contain certain bonuses). Lobby rooms—Spheres that are conjoined with Spheres sharing same locations on $\frac{2}{3}$ axis (creating multiple Spheres conjoined by short 1 axis tunnel)

Lobby rooms can be used for players to meet other players, talk, group up for a mission, trade. Lobby rooms would be held on a remote server along with Missions.

User interface—Add-Ons:

May connect to the hand held computer a "Remote" that will interact with the program using buttons. May connect a visual device to have a secondary same-Sphere-viewing device (preferably wearable tech such as glasses-like-device with a screen)

To be used as:

Gaming experience

Weapon training, specifically focusing on muscle memory.

People who would like to show a specific space to a remote user. (IE: show a house for sale, or a place to share with family/friends) Art/nature photos; Spheres; Social networking.

Trading Spheres/Levels for some type of currency (would choose one when relevant.)

The gaming experience described: (basic) The user would select from the different Game-Spheres.

The user can use the intended remote pistol to enhance the gaming experience, or use on screen touch-buttons.

The user can attach a secondary display computer headware, such as Google Glass, smart goggles or another resemblance device.

Once the sphere loads the user may view the Sphere by moving the hand held computer screen to view the Sphere and its different corners. Then "Avatars" would be created inside the Sphere allowing user to interact with them. ("Avatars" would act as programmed by the Editor.)

Other objects and features of the present invention will become apparent when considered in combination with the accompanying drawing figures, which illustrate certain preferred embodiment of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing figures, wherein similar features are denoted with similar reference numerals throughout the several views.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures:
10 computer application
12 physical ambient environment
14 mobile device
16 camera image display
18 camera image focal point
20 camera nodal point
22 captured image
24 captured image borders
26 sphere segment
28 Sphere/digitally imaged ambient environment
30 Internet accessible data storage

DETAILED DESCRIPTION OF THE DRAWING FIGURES AND PREFERRED EMBODIMENTS

Figure 1:
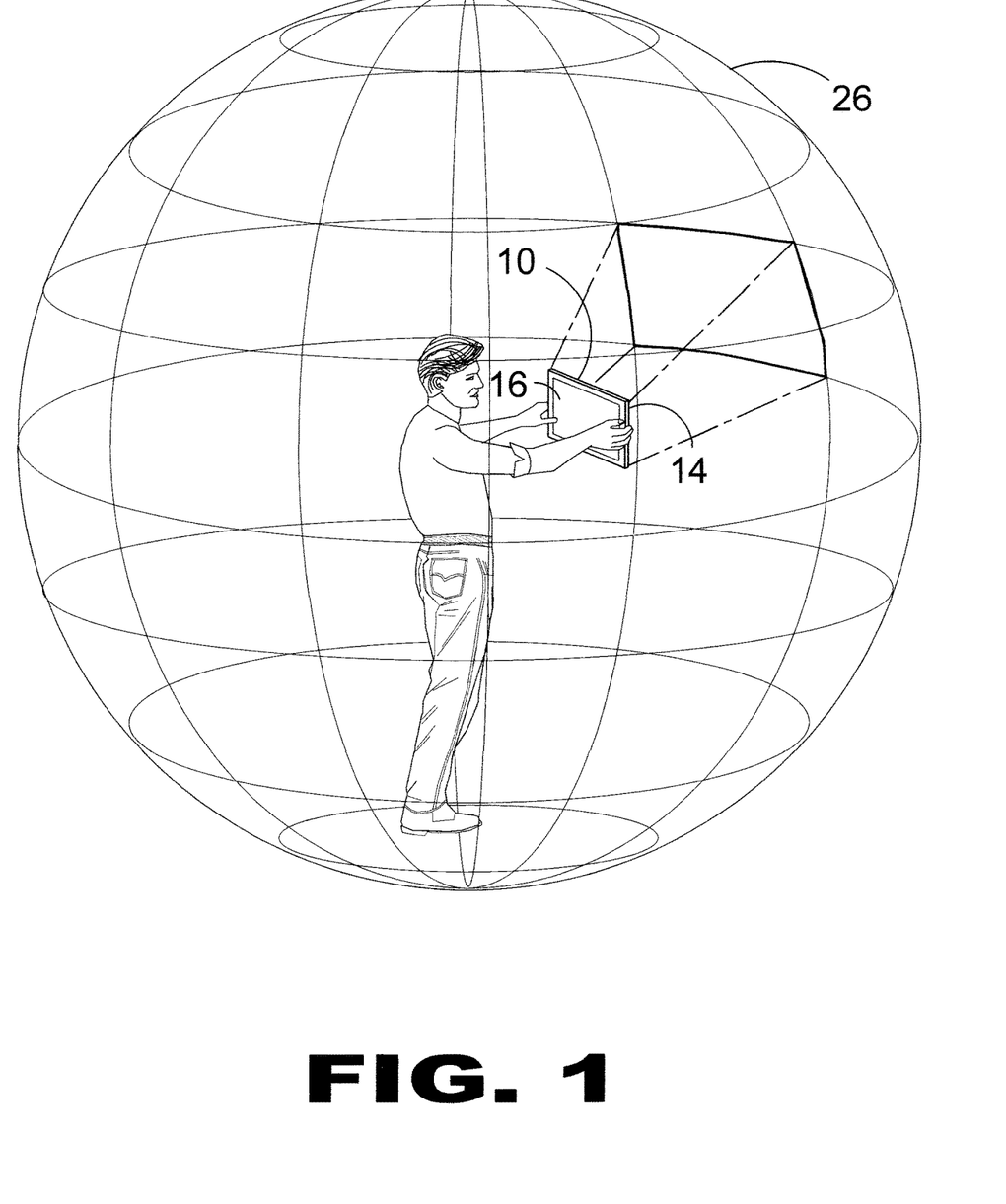
FIG. 1 is an overview of the handheld computer application for creating virtual world gaming spheres of the present invention.

Turning now, in detail, to an analysis of the accompanying drawing figures, FIG. 1 presents an overview of the present invention in use. The present invention 10 is application software (app) for a handheld computer 14 having a processor, memory, camera, touch input display, accelerometer, gyroscope and operating system with the app conjoining a plurality of camera images into a 360-degree virtual sphere enabling a user of the handheld computer 14 to create a virtual sphere from a plurality of camera images and application software, sensor and processor coupled to the display. the processor can be adapted to obtain three dimensional imagery data, create a virtual sphere around the mobile device according to the three dimensional data, calibrate the virtual container, select a first portion of an inner surface, present at the display a first image derived from the 3d imagery data, receive sensor data from the sensor, detect from the sensor data a movement by the mobile device, select a second portion of the inner surface of the virtual container according to the detected movement, and present at the display a second image, wherein the second image is derived from 3D imagery data. The 360-degree immersive image adapts to the position of the device when it is turned down, for example, displays a map of the environment, and when directed vertically, the environment appears in perspective mode.

Figure 2:
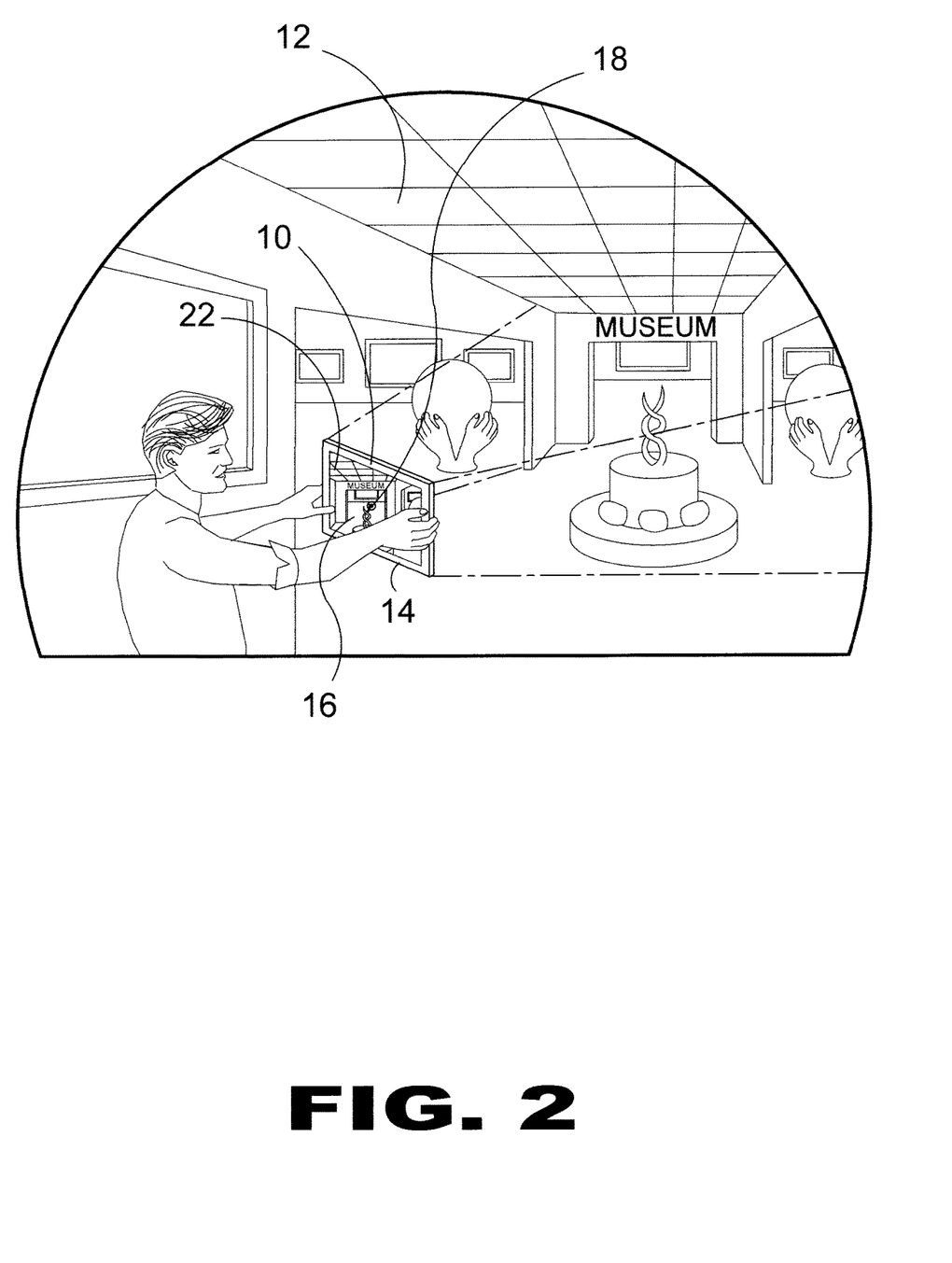
FIG. 2 is an overview as an example of use of the handheld computer application for creating virtual world gaming spheres of the present invention in a representative environment.

Referring to FIG. 2, as an example of use of the handheld computer application for creating virtual world gaming spheres of the present invention in a representative environment, in which a user is depicted as having application software 10 in a handheld computer 14 creating from ambient physical environment 12 a virtual sphere coupled to the display 16. The processor can be adapted to obtain a virtual sphere around the mobile device 14 according to the data, calibrate the virtual container, select an image 22 from the 3D imagery data, receive sensor data from the sensor, detect from the sensor data a movement by the mobile device, select a second portion of the inner surface of the virtual container according to the detected movement, and present at the display a second image, wherein the second image is derived from 3D imagery data. The 360-degree immersive image adapts to the position of the device when it is turned down, for example, displays a map of the environment, and when directed vertically, the environment appears in perspective mode.

Figure 3A:
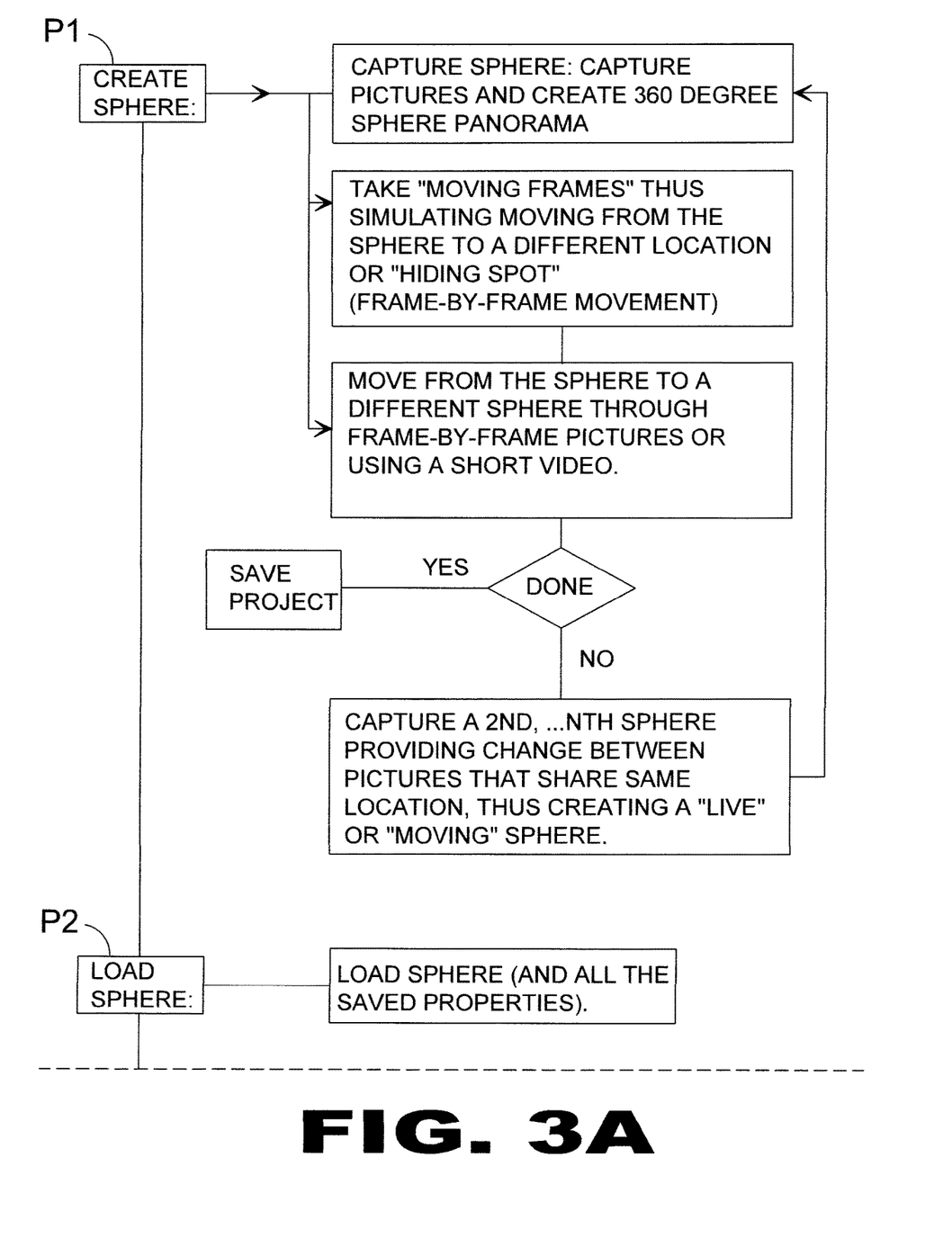
FIG. 3A is a first portion of a block diagram for a preferred embodiment of the handheld computer application for creating virtual world gaming spheres of the present invention.
Figure 3B:
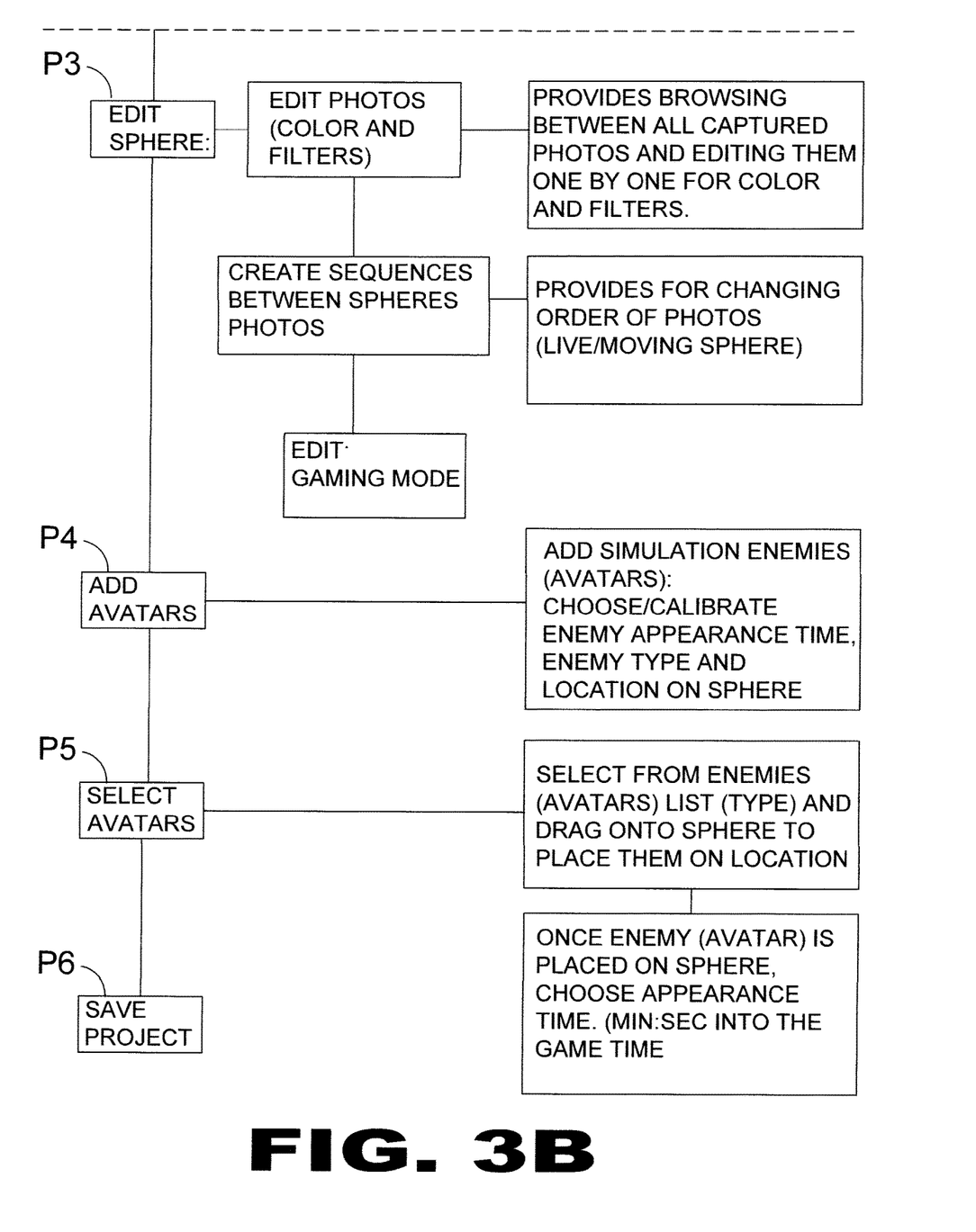
FIG. 3B is a second portion of the block diagram that continues from FIG. 3A for explaining a preferred embodiment of the handheld computer application for creating virtual world gaming spheres of the present invention; and, FIG. 4 is a chart presenting a preferred embodiment of the handheld computer application for creating virtual world gaming spheres of the present invention.

FIGS. 3A and 3B, taken together, present a diagram depicting the computer application of the present invention through the typical processes of create, edit, modify, save and load/run. Create sphere, shown as P1 entails positioning a mobile device at a desired location within a physical environment, creating a camera nodal point or nodal view port, taking sufficient digital images while pivoting the mobile device horizontally and vertically about the camera nodal point to digitally replicate the physical environment. Apparent movement is achieved through a plurality of spaced apart camera nodal points each having sufficient digital images to create a changing panoramic view port while moving along nodal-point paths. After creating the sphere is saved, shown in P6. Edit sphere, shown as P3, enables changing the color composition of each digital image and filters changing sphere color. Modifying a sphere, as shown in P4 and P5, entails enabling a sphere with functional features, such as avatars, weapons and portals. Avatars are selected from a gallery of avatars, given an appearance location within a sphere and a given time during game play to appear.

Figure 4:
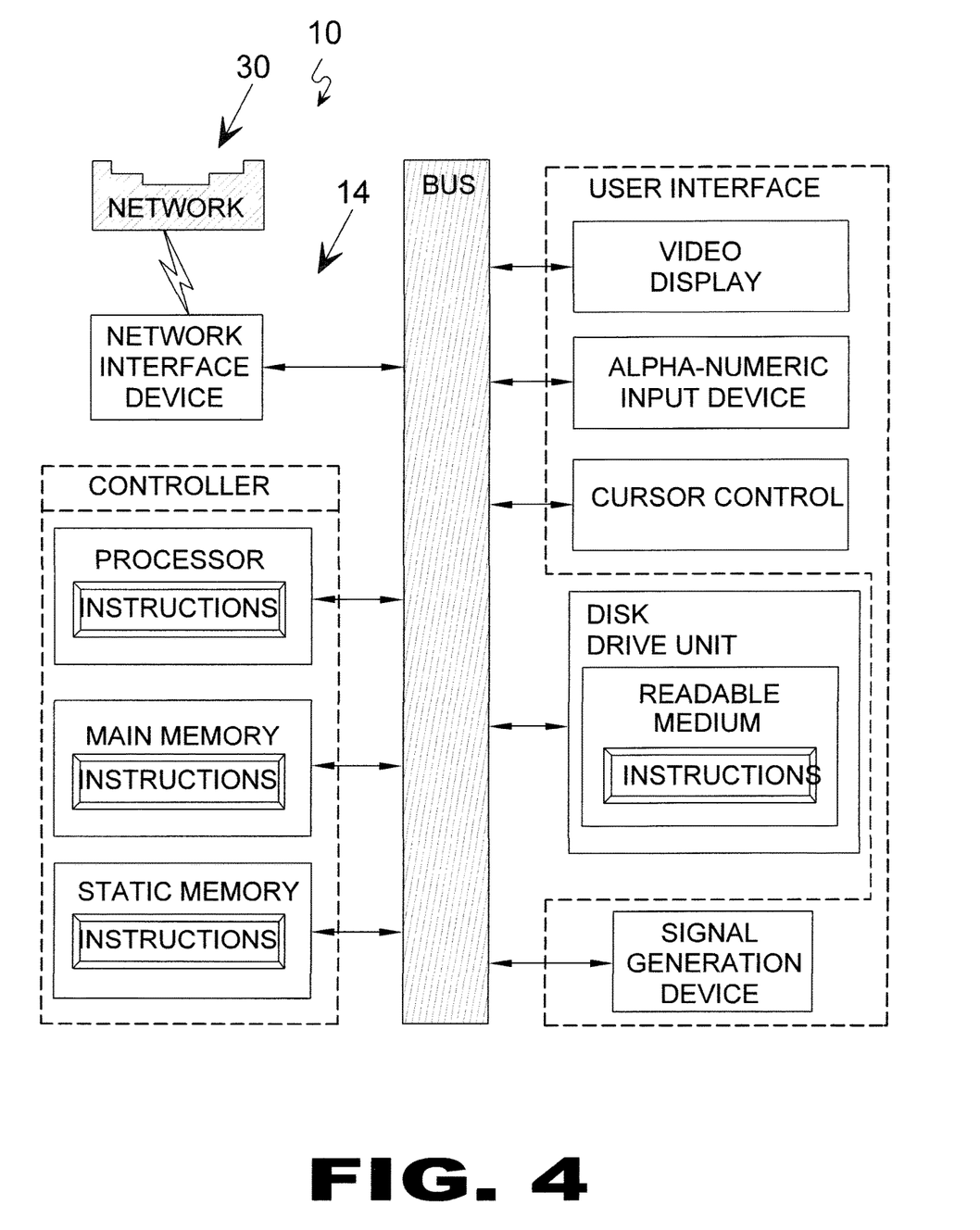

Finally, turning to FIG. 4, shown is a chart of depicting a mobile device in communication with an Internet accessible network. The present invention 10 provides a remote server 30 for users to upload from mobile device 14 creations of their environment to be used in a gaming mode or as a virtual reality visit of historical objects and buildings.

In a preferred embodiment, further provided is an Internet accessible website for uploading and downloading app created/modified virtual spheres that can be shared and/or traded and/or licensed through the Internet accessible website. The application further provides for users to create tunnels/portals serving as passages between spheres.

Additionally, the application provides for layering spheres by creating a first virtual sphere from a first handheld computer nodal point then positioning to a second nodal point approximate the first nodal point then assembling a second sphere forming conjoined spheres creating apparent movement of the sphere moving in time.

While only several embodiments of the present invention have been shown and described, it will be obvious to those skilled in the art that many modifications may be made to the present invention without departing from the spirit and scope thereof

What is claimed is:

1. A non-transitory computer readable storage medium for performing a method for creating a panoramic view port about a nodal point, comprising the steps of:
   positioning an image-capturing mobile device at a nodal point;
   capturing a first digital image having a focal point within a left border, a right border, a top border and a bottom border of an image;
   pivoting said image-capturing mobile device about said nodal point until the focal point of a subsequent image moves outside of either the left border, right border, top border or bottom border of a previous image, wherein an application indicator displays on a preview image aiding in adjacent border alignment subsequent to image capture;
   conjoining the subsequent image with the one or more previous images into a sphere segment; and, looping through a process of pivoting the image-capturing mobile device, conjoining subsequent captured images with said sphere segment until a desired spherical view port about a nodal point has been created.

2. The non-transitory computer readable storage medium for performing a method for creating a panoramic view port about a nodal point according to claim 1, wherein said spherical view port provides a panoramic view equal to, or greater than, 180°.

3. The non-transitory computer readable storage medium for performing a method for creating a panoramic view port about a nodal point according to claim 1, further comprising the step of emulating apparent movement between sphere locations by creating a plurality of node points spaced between the locations with movement from a node point controlled by a user depicting a related panoramic view port.

4. The non-transitory computer readable storage medium for performing a method for creating a panoramic view port about a nodal point according to claim 1, further comprising the step of providing autonomous digital entities having predefined property sheets and function.

5. The non-transitory computer readable storage medium for performing a method for creating a panoramic view port about a nodal point according to claim 4, further comprising the step of providing tunnels through zooming in to a designated nodal point moving frame-by-frame to a center area of an adjacent sphere.

6. The non-transitory computer readable storage medium for performing a method for creating a panoramic view port about a nodal point according to claim 4, further comprising the step of providing tunnels through zooming in to a designated nodal point, followed by playing a video for moving to a center area of an adjacent sphere.

7. The non-transitory computer readable storage medium for performing a method for creating a panoramic view port about a nodal point according to claim 4, further comprising the step of providing door actuators for moving between disparate spheres.

8. The non-transitory computer readable storage medium for performing a method for creating a panoramic view port about a nodal point according to claim 1, further comprising the step of providing avatars selectable from a collection of avatars and behavioral patterns selectable from an abilities menu including appearance time, location, and duration.

9. The non-transitory computer readable storage medium for performing a method for creating a panoramic view port about a nodal point according to claim 8, further comprising the step of providing said avatars with weapons selectable from a list of weapons.

10. The non-transitory computer readable storage medium for performing a method for creating a panoramic view port about a nodal point according to claim 8, further comprising the step of providing said avatars as non-playing characters when encountered providing information to a user.

11. The non-transitory computer readable storage medium for performing a method for creating a panoramic view port about a nodal point according to claim 1, further comprising the step of providing Internet accessible sphere storage through Internet access to a database of collaboratively developed spheres.

* * * * *